(No Model.) 2 Sheets—Sheet 1.
W. H. PRINZ.
METHOD OF AND APPARATUS FOR MALTING GRAIN.
No. 515,841. Patented Mar. 6, 1894.
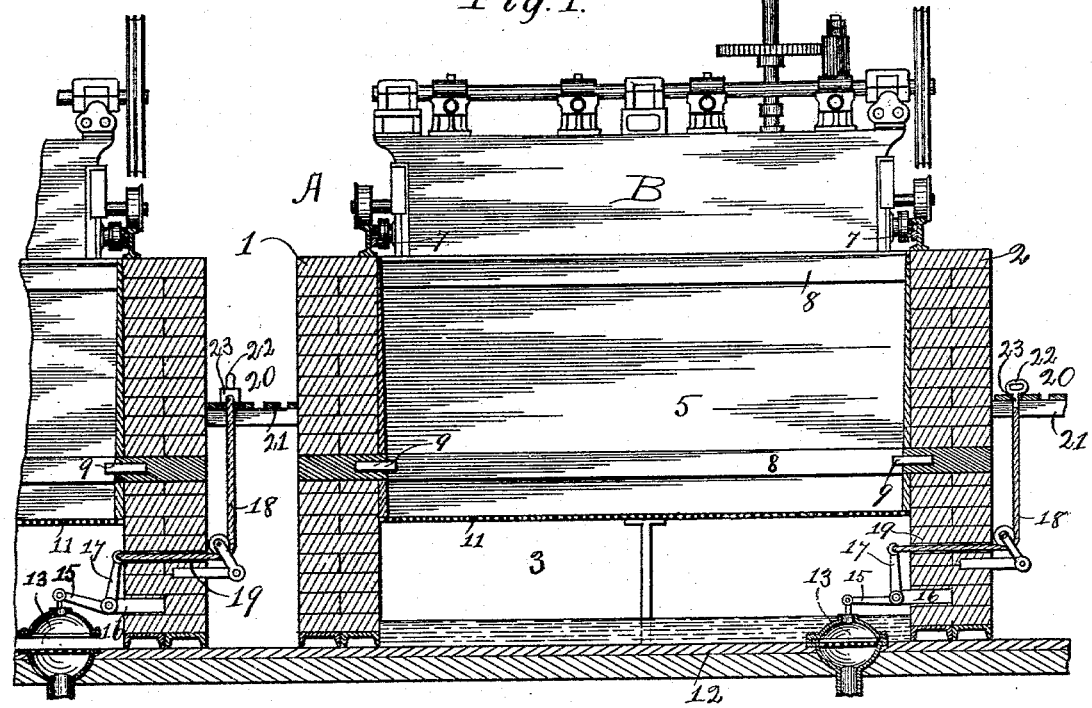
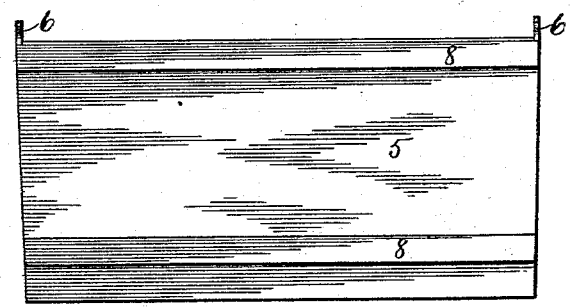
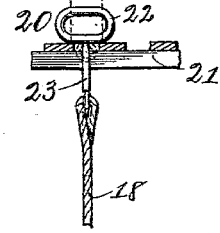
Witnesses:
Rudolph W. Lotz
John Gubbins
Inventor:
William H. Prinz
By Lotz & Kennedy
Attorneys.

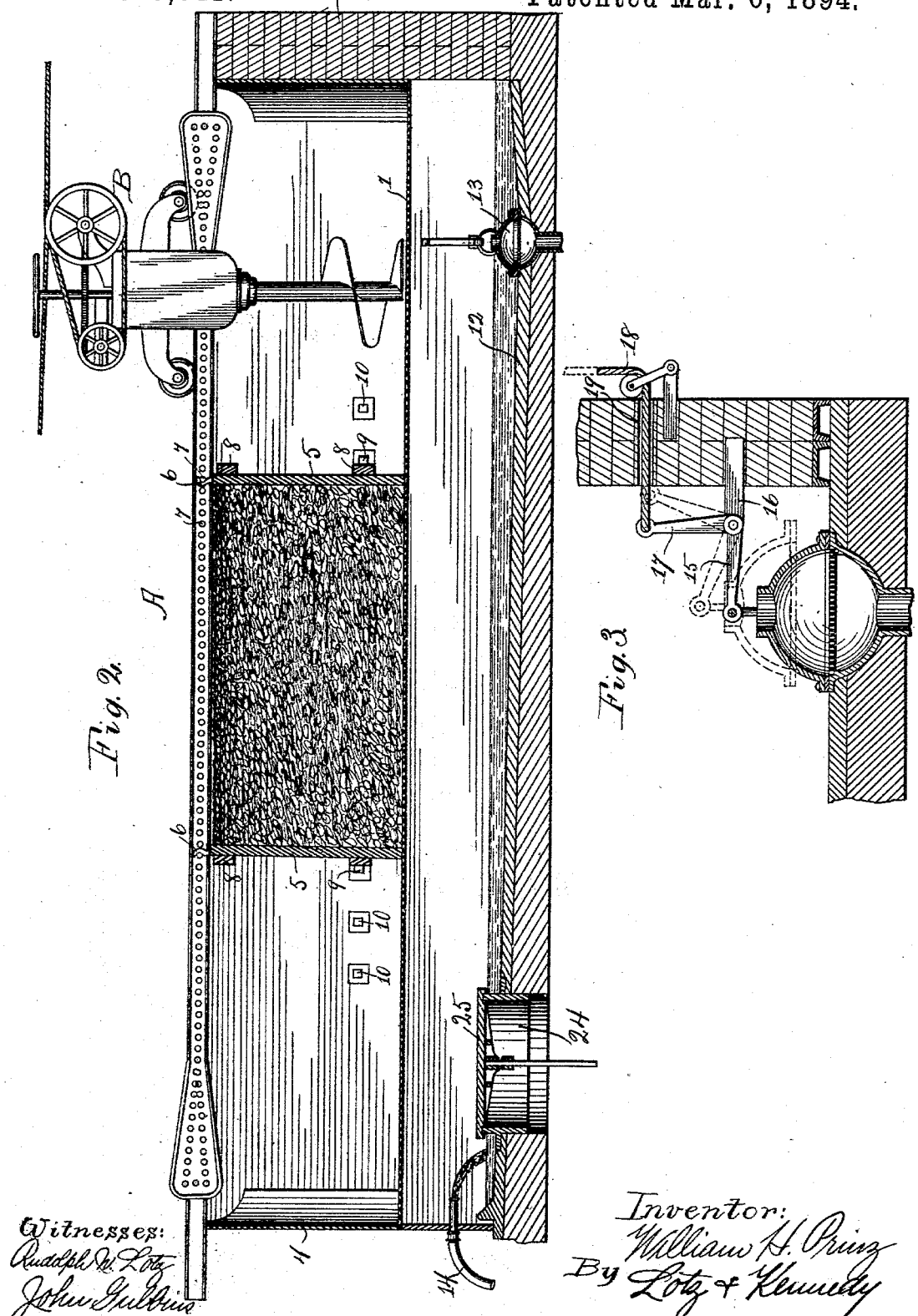

UNITED STATES PATENT OFFICE.

WILLIAM H. PRINZ, OF CHICAGO, ILLINOIS, ASSIGNOR TO THE SALADIN PNEUMATIC MALTING CONSTRUCTION COMPANY, OF SAME PLACE.

METHOD OF AND APPARATUS FOR MALTING GRAIN.

SPECIFICATION forming part of Letters Patent No. 515,841, dated March 6, 1894.

Application filed March 28, 1893. Serial No. 468,064. (No model.)

*To all whom it may concern:*

Be it known that I, WILLIAM H. PRINZ, a citizen of the United States, residing at Chicago, in the county of Cook and State of Illinois, have invented certain new and useful Improvements in Methods of and Apparatus for Malting Grain; and I do hereby declare the following to be a full, clear, and exact description of the invention, such as will enable others skilled in the art to which it appertains to make and use the same.

This invention relates to a novel method and apparatus for the malting of grain whereby such operation can be carried on in a quicker and more satisfactory manner.

The invention consists in the several steps and in the features of construction and combinations of parts hereinafter fully described and specifically claimed.

In the accompanying drawings illustrating my invention in the apparatus, and illustrating one way in which said method can be carried out,—Figure 1 is a cross section of a germinating compartment and a portion of an adjacent compartment for germinating grain by the pneumatic process, and constructed in accordance with my invention. Fig. 2 is a longitudinal vertical section of such a compartment. Figs. 3, 4 and 5 are detail views.

This method and apparatus has particular reference to the system of malting by the pneumatic process known as the Saladin system, in which grain is placed in a germinating compartment having a perforated bottom and which is also provided with mechanical stirrers that move up and down the compartment to stir the grain. The moisture and ventilation supplied to the grain during the germinating process is sent through the perforated bottom by suitable means employed in this process.

The first step of the malting process after the grain leaves the steeping tanks, is that known as couching, that is, the grain is heated preparatory to the sprouting thereof, and to accomplish the couching of the grain I first place the body of grain in a high or compact mass much higher and thicker than the condition in which it will be when the sprouting and germinating take place. The body of grain that is to be germinated in one of these compartments is first placed therein and confined between suitable frames until it stands in a compact mass about even with the top of the germinating compartment. After staying in this condition a certain length of time it generates a certain amount of heat and then the frames by which it is confined are removed and the body of grain stirred up or agitated and then spread out a little until it is not so thick as when first placed in the germinating compartment, and then after remaining in this second condition a certain length of time it generates more heat and then is spread out and stirred up a second time, and so on until the couching process is complete or when the grain commences to sprout. In this way the grain is held in such a condition that heat is generated which is necessary to start the sprouting thereof and it is gradually spread out from its compact mass and stirred up, to prevent overheating or the formation of mold until the sprouting takes place. When the sprouting starts it is necessary to ventilate the grain and supply moisture thereto to carry off the carbonic acid gas that has generated and to prevent mold until the germination is complete, and to accomplish this purpose the germinating compartment is supplied with suitable devices for ventilating the grain and supplying moisture thereto, but as these features are known in the system of pneumatic malting referred to I will not describe them with particularity in connection with my process for couching the grain, which consists in first placing a body of grain to be germinated in a suitable compartment and confining it in a compact or thick mass, much thicker than the condition it will be placed in during the germinating process, and gradually spreading out such body of grain and stirring or agitating such body of grain during such spreading operation.

Referring now to said drawings, A indicates a germinating compartment of the form used in the Saladin system of pneumatic malting, having the side walls 1 and 2, the end wall 3 and the removable front wall or plates 4.

Mounted upon the walls 1 and 2 of such compartment is a stirring apparatus indicated as a whole by B, which is suitably geared to said walls and connected with suitable mechanism whereby said stirring apparatus can be moved up and down the compartment to stir the grain placed therein.

In accordance with the principle involved by my invention I provide what is termed a couch frame, by means of which the grain placed in the germinating compartment A can be confined in a particular portion of the compartment instead of being spread out over the entire floor whereby, when the grain is first placed therein, it can be held in a thick mass to accomplish the couching thereof. Said couch frame consists essentially of two plates 5 that are provided at their upper ends with hooks 6 that are bent outwardly to engage the teeth 7 of the rack-bar supported upon the walls 1 and 2 of the compartment and which forms part of the gearing for moving the stirrers up and down the compartment. It is, of course, obvious that other means can be employed besides said teeth 7 for holding the said plates 5 in position, such as suitable projections along the sides of the compartment, but as these teeth provide such projections and are a part of the apparatus as constructed, I prefer to employ them in lieu of providing the special projections to be engaged by these hooks 6. The said plates 5 are preferably strengthened by crossbars 8 near their upper and lower ends. It will be noted that the pressure upon the plates is always from the inside since the grain is confined between them, and to hold said plates near their lower ends in a simple and convenient manner I employ pins 9 that are placed within recesses 10 in the inner faces of the walls 1 and 2 of the compartment A. When these pins 9 are placed within the recesses 10 they project slightly, as shown in Fig. 1, beyond the sides of the walls and thus provide projections to encounter the said plates 5. A series of these recesses 10 are made in the walls of the compartment at certain intervals, whereby the plates 5 can be gradually separated, as will be plainly obvious. In using this couch frame they are first secured in such positions as shown in Fig. 2, that the body of grain to be germinated in the compartment when placed between said plates will reach to about the top of the compartment. After remaining in this condition for some time the grain heats and one or more of the plates can then be removed, and then by running the stirring apparatus through the grain it can be turned sufficiently and then the couch frame is again set in place with the plates a little farther apart. This operation is continued until the couching operation is finished, whereupon the plates are removed from the compartment and the grain spread over the entire perforated floor 11 thereof. The grain is now in condition to be germinated, and I have found that by alternately raising and lowering the temperature thereof the germination thereof is carried on with much better success and that a finer grade of malt is produced, and in accordance therewith I raise the temperature of the grain and then lower the same and continue this heating and cooling of the grain until it is fully germinated. It will be understood, of course, that the degree of temperature to which the grain is raised and lowered will vary according to the varying conditions of the grain being germinated and practice of the maltster, and therefore the exact limits cannot be stated, as it rests in the discretion and observations of a maltster. It will be stated, however, that one maltster observes 77° Fahrenheit as about the upper limit, and 52° Fahrenheit as about the lower limit under which the operation was carried on. It must be noted, however, that better results might be and might have been obtained when other limits of temperature were reached, and, therefore, the temperature is left to the discretion of the maltster carrying on the process. To accomplish this object I alternately ventilate and supply moisture to the grain, such moisture having the effect of raising its temperature, while the ventilation serves to lower the temperature. To supply such moisture to the grain that is resting upon the perforated bottom 11 of the compartment, I prefer to employ a body of water that is placed beneath such perforated bottom 11, and in the instance illustrated I employ a trough or receptacle 12 that is made beneath the perforated bottom 11, which trough has inclined sides leading to a point where a valve 13 is located by which the water can be drained off from said trough 12. Said trough 12 extends over the entire floor of the compartment and can be supplied with water from any suitable source, such as a hose 14. To control the said valve 13 said valve is carried by one arm 15 of a bell-crank lever that is pivoted upon a projection 16 in the side wall 2 of the compartment, while the other arm 17 of said bell-crank lever is connected by means of a cord or strand 18 passing through an opening 19 in said wall 2, with a handle 20 located above the walking boards or slats 21 between the different compartments. As illustrated in Figs. 1 and 5, the handle 20 comprises an eye or loop 22 that is secured at right angles to a flat plate 23 that will pass between the slats or boards 21, so that, as illustrated in Fig. 5, in full lines, when the plate 23 is passed between the slats the loop 22 will rest against the upper faces of the board, or, as shown in dotted lines in said Fig. 5, when the handle 20 is raised and turned so that the lower edge of the plate 23 rests on the boards the parts will be held in this elevated position. In this way it will be seen that the handle 20 can be raised or lowered to open or close the said valve 13. An air flue 24 is made through the compartment floor and provided with a valve 25, by means of which it may be closed, said flue being used for the purpose of ventilation.

I claim as my invention—

1. The herein-described method of germinating steeped grain which consists in ventilating the same at intervals, and raising the temperature of the grain after each period in which it is ventilated, substantially as described.

2. The herein-described method of germinating steeped grain which consists in lowering the temperature of the same at intervals by supplying cool moist air thereto, and raising the temperature of the grain after each period in which it is lowered, substantially as described.

3. The herein-described method of germinating steeped grain which consists in lowering the temperature thereof at intervals, and supplying moisture thereto between such periods in which the temperature of the grain is lowered, substantially as described.

4. The combination with a germinating compartment, of a couch frame consisting of two plates longitudinally adjustable within said compartment, substantially as described.

5. The combination with a germinating compartment, of a couch frame consisting of two plates located between the walls of the compartment and movably secured thereto, substantially as described.

6. The combination with the walls of a germinating compartment having projections, of a couch frame consisting of two plates to be secured against said projections, substantially as described.

7. The combination with the walls of a germinating compartment having a series of projections and a series of recesses with removable pins, of a couch frame consisting of two plates having hooks to engage said projections, substantially as described.

8. The combination with the walls of a germinating compartment having a series of projections near their upper edges and a series of recesses near their lower edges to receive pins, of a couch frame consisting of two plates having hooks at their upper ends, substantially as described.

9. The combination with a germinating compartment having a perforated bottom, of a trough located below said bottom, and means for supplying water thereto substantially as described.

10. The combination with a germinating compartment having a perforated bottom, of a trough located below said bottom and having its sides inclined toward one point, a valve located thereat, devices for controlling said valve, and means for supplying water thereto substantially as described.

In testimony whereof I affix my signature in presence of two witnesses.

WILLIAM H. PRINZ.

Witnesses:
HARRY COBB KENNEDY,
RUDOLPH W. LOTZ.